(12) United States Patent
Srinivasan et al.

(10) Patent No.: US 11,604,676 B2
(45) Date of Patent: Mar. 14, 2023

(54) PREDICTIVE SCHEDULED BACKUP SYSTEM AND METHOD

(71) Applicant: EMC IP Holding Company LLC, Hopkinton, MA (US)

(72) Inventors: Sharath Talkad Srinivasan, Bengaluru (IN); Upanshu Singhal, Bangalore (IN); Srikanth Venkataraman, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 289 days.

(21) Appl. No.: 16/909,953

(22) Filed: Jun. 23, 2020

(65) Prior Publication Data

US 2021/0397474 A1 Dec. 23, 2021

(51) Int. Cl.
*G06F 3/06* (2006.01)
*G06F 9/48* (2006.01)
*G06F 9/455* (2018.01)

(52) U.S. Cl.
CPC ............ *G06F 9/4881* (2013.01); *G06F 3/065* (2013.01); *G06F 3/0619* (2013.01); *G06F 3/0659* (2013.01); *G06F 3/0664* (2013.01); *G06F 3/0673* (2013.01); *G06F 9/45558* (2013.01); *G06F 2009/45583* (2013.01); *G06F 2209/486* (2013.01)

(58) Field of Classification Search
CPC ...... G06F 9/4887; G06F 9/4881; G06F 3/065; G06F 3/0659; G06F 3/0673; G06F 3/0664; G06F 3/0619; G06F 11/1461; G06F 11/1451; G06F 11/3419; G06F 11/3409; G06F 2209/486; G06F 2201/865; G06F 2209/481; G06F 9/45558; G06F 2009/45583; G06F 2201/81; G06F 2201/815
USPC ............................................... 711/162; 718/1
See application file for complete search history.

(56) References Cited

U.S. PATENT DOCUMENTS

| | | | |
|---|---|---|---|
| 6,704,885 B1 * | 3/2004 | Salas-Meza ............ | H04L 67/55 714/E11.124 |
| 8,260,752 B1 * | 9/2012 | Stringham .......... | G06F 11/1451 707/649 |
| 2008/0263551 A1 * | 10/2008 | Ali ...................... | G06F 11/1461 718/102 |
| 2020/0409908 A1 * | 12/2020 | Ahn ...................... | G06F 3/0607 |
| 2021/0034571 A1 * | 2/2021 | Bedadala ............ | G06F 21/6227 |

* cited by examiner

*Primary Examiner* — Hashem Farrokh
(74) *Attorney, Agent, or Firm* — Staniford Tomita LLP (57) ABSTRACT

Embodiments for predictive scheduling of backups in a data protection system by initiating a first backup job in a series of scheduled consecutive backup jobs, wherein a second backup job is allowed to begin only after the first backup job is finished and not active, detecting whether or not the first backup job is still active when a second job is to start, and if so, estimating an amount of additional time required to finish the first backup job. The second backup job is then rescheduled to start at least at the end of the additional time. The estimated amount of additional time is determined using a throughput to target storage device parameter. This parameter is periodically checked to determine if there is a change to the estimated amount of additional time, and if so, the estimated time is recalculated based on the changed parameter.

19 Claims, 6 Drawing Sheets

PREDICTIVE SCHEDULED BACKUP SYSTEM AND METHOD

TECHNICAL FIELD

Embodiments are generally directed to data backup systems, and more specifically to predictive scheduling of backup jobs.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage.

Backup jobs are typically scheduled on a regular period, such as daily, weekly, monthly, and so on. Certain highly critical data processing applications may have backups taken relatively frequently, such as every few hours or at least once a day. The time to complete a backup job depends on many factors, such as amount of data to be backed up, type of backup (e.g., full, incremental, differential), network bandwidth, storage media speed, and so on. Some backup jobs are completed well within the time between the backup periods, while others may go beyond the backup period. In general, a next scheduled backup job will not start if the current backup job is not completed. Existing backup systems thus skip a scheduled backup if the previous backup job is still running for the same backup schedule. This results in a backup failure if the previous backup job is still running, as there will not be any backup of the data until the next scheduled backup after the previous job completes.

Consider for example, a customer use case where a backup is scheduled at 12:00 midnight and the backup interval is 24 hours. A full backup may takee take more than 24 hours to complete due to a large number of Virtual Machines and/or data. In this case, next scheduled backup will be skipped and marked as failed. In this case, the user who had to take an incremental backup of a VM every 24 hours, will miss the next day's schedule and backup up will be attempted on the third day. Hence the user would miss the second day's scheduled backup. If this full backup actually takes 26 hours to complete, it would overlap with the second day's scheduled backup. Since, this backup is skipped, due to the 2 hour overlap, the next backup is initiated on the third day. If the VM gets corrupted on the second day, the system would have lost the data of the second day as the schedule was missed, thus resulting in at least some data loss. Persistent failure of scheduled backup jobs can lead to potentially significant data loss if a system failure occurs after one or more skipped backups.

What is needed, therefore, is a backup system that can intelligently reschedule backup jobs to accommodate potentially overlapping backup jobs.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. DellEMC, NetWorker, Data Domain, and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
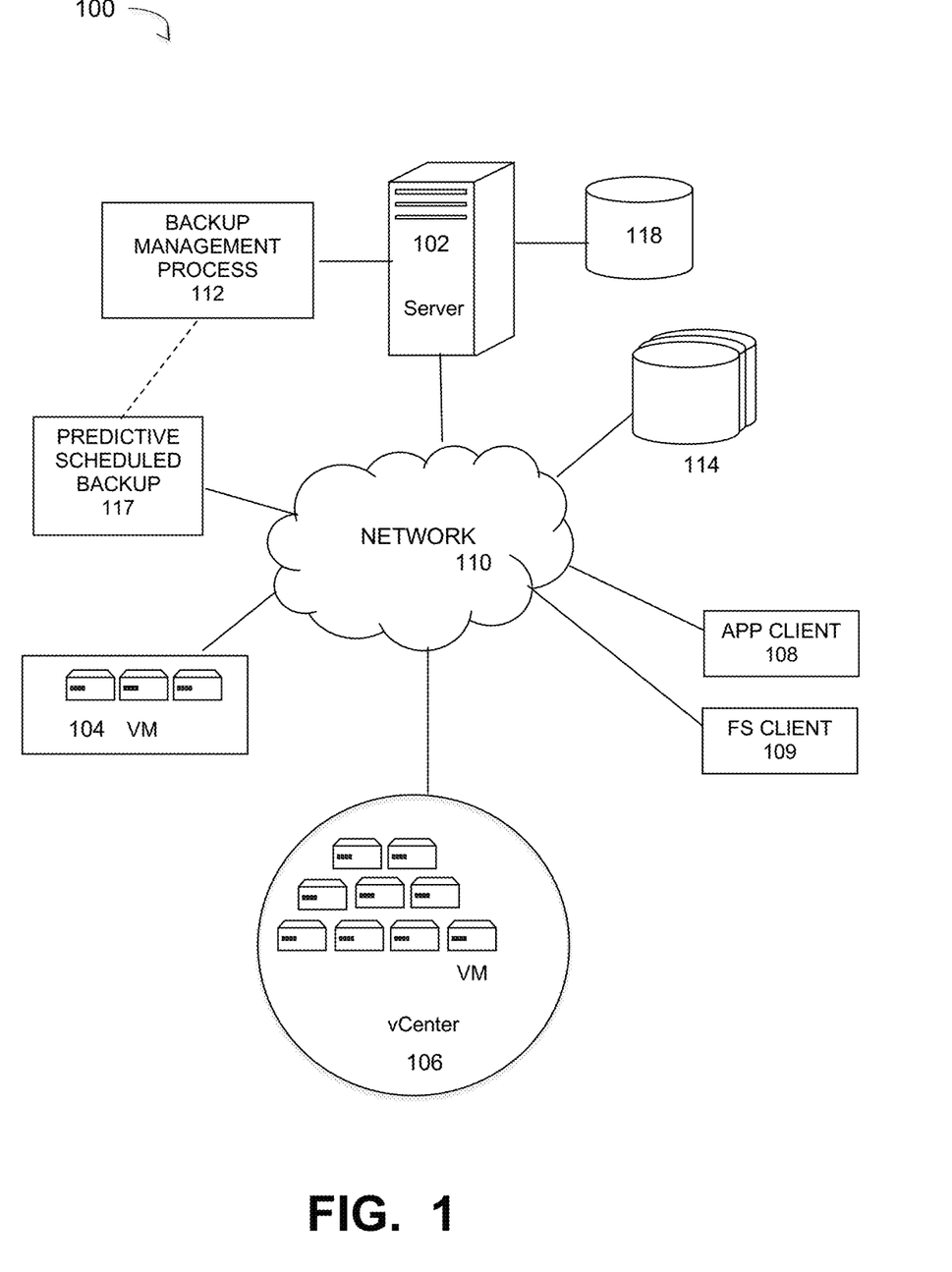
FIG. 1 is a diagram of a large-scale data backup systems implementing a predictive scheduled backup process, under some embodiments.

FIG. 1 illustrates a computer network system 100 that implements one or more embodiments of a predictive scheduled backup method and system. System 100 represents a network backup system that can backup data from one or more data sources to one or more different storage media domains, such as a physical disk storage domains and virtual hard disk (VHD) domains. Embodiments include a method and system that can intelligently reschedule the overlapping scheduled job to the completion of the active job by dynamically predicting the ongoing active backup job completion time.

In an embodiment, system 100 includes a number of virtual machines (VMs) or groups of VMs that are provided to serve as backup targets. Such target VMs may be organized into one or more vCenters (virtual centers) 106 representing a physical or virtual network of many virtual machines (VMs), such as on the order of thousands of VMs each. The VMs serve as target storage devices for data backed up from one or more data sources, such as application clients 108 or file system (FS) clients 109. Other data sources having data to be protected and backed up may include other VMs 104 and data in network storage 114.

The data sourced by the data source may be any appropriate type of data, such as database data that is part of a database management system. In this case, the data may reside on one or more storage devices of the system, and may be stored in the database in a variety of formats. One example is an Extensible Markup Language (XML) database, which is a data persistence software system that allows data to be stored in XML format. Another example is a relational database management system (RDMS) which uses tables to store the information. Application client 108 may represent a database component that instantiates a program that interacts with the database. Each instance of a database component may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 106, and to the data sources 108 and 109 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

Besides VM storage, the data sourced by system 100 may be stored in any number of other storage locations and devices, such as local client storage, server storage (e.g., 118), or network storage (e.g., 114), which may at least be partially implemented through storage device arrays, such as RAID components. In an embodiment, network storage 114 and even server storage 118 may be embodied as iSCSI (or similar) disks that provide dynamic disk storage. Other types of storage architectures may also be used, such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices.

For the embodiment of FIG. 1, network system 100 includes a server 102 that executes a backup management process 112 automates the backup of network data using the target VM devices or the dynamic disks 114. In an embodiment, the process 112 uses certain known full and incremental (or differencing) backup techniques along with a snapshot backup process that is used to store an image or images of the system(s) to be backed up prior to the full or incremental backup operations. In an embodiment, system 100 may represent a Data Domain Restorer (DDR)-based deduplication storage system, and storage server 128 may be implemented as a DDR Deduplication Storage server provided by DellEMC Corporation. However, other similar backup and storage systems are also possible.

In a general implementation, a number of different users (or subscribers) may use backup management process 112 to back up their data on a regular basis to virtual or physical storage media for purposes of data protection. The saved datasets can then be used in data restore operations to restore any data that may be lost or compromised due to system failure or attack. The users may subscribe to a service level agreement (SLA) that dictates certain terms with regard to backup frequency, data capacity, and so forth under a paid arrangement with a storage vendor or system administrator. Typically, the backup management process 112 backs up each user's data on a regular periodic basis (e.g. daily, weekly, etc.) based on the SLA. As stated above, backup jobs are executed regularly according to the defined schedule as long as current or previous backup jobs complete within the required (or defined maximum) time period. If a current backup job runs over the backup period, the next and possibly subsequent backup jobs will be suspended, resulting in the failure of one or more backup jobs.

Present solutions to preventing problems associated with overlapping backup jobs include monitoring the status of ongoing active backup job, and rescheduling backup jobs at predefined intervals. Both of these current methods, however, have certain disadvantages. The monitoring method monitors the ongoing backup job status and keeps the scheduled backup job active in a queue, and once the ongoing backup job is complete, the scheduled backup job will be triggered. The biggest disadvantage of this method is overconsumption of resources like VM proxy (e.g., vProxy) sessions which are very critical resource with respect to VM implementations. A vProxy session provides ideal monitoring the queue and completion of the ongoing backup jobs. However, if there are many (e.g., 100 or more) active VM backup jobs running, the backup server needs to monitor all the VMs individually for its completion and then initiate the schedule job for that VM. This is expensive as it consumes huge amount of backup server resources. Also, this process cannot differentiate and prioritize between a scheduled job and new backup job. Additionally, handling and providing resources to a scheduled backup and a new backup job has different priorities, thus resulting in different process of these scenarios.

With respect to rescheduling of backup jobs at predefined intervals, which involves periodically checking for backup failures and triggering them at a predefined intervals, this approach may miss the Recovery Point Objectives (RPOs) and may encounter data loss in case the backup job completes before the next trigger. This may also draw complications as there could be an overlap of the VM being protected.

In an embodiment, system 100 includes a predictive scheduled backup process or component 117 that can intelligently estimate a completion time of a current (active) backup job and reschedule the next overlapping scheduled job after the completion of the active job, rather than skipping the overlapping job. This process dynamically predicts the ongoing active backup job completion time, to overcome the above-mentioned and other problems associated with overlapping backup jobs.

The predictive scheduled backup process 117 may be provided as a cloud-based solution executed in network 110, or it may be part of the backup server 102 as a component, or as part of the backup management process 112 as a sub-process or additional processing component within the backup management software. In either implementation, process 117 provides some intelligence to the backup server to estimate the end time of the ongoing backup operation and update that scheduled backup instance to be run once the ongoing backup operation is completed. This is achieved by co-relating the data available in the media database of the backup server. If the backup operation is in active state, the system has all the information to estimate the time required to complete that backup process, through certain parameters like the total size of the VM, target device type, throughput of an ongoing backup operation, total data written, remaining data to be written to target storage, and so on. Once these parameters are available, the system can estimate the remaining time to complete the ongoing backup operation.

In an embodiment, the network system of FIG. 1 is implemented as a DellEMC NetWorker (or similar) data protection system. NetWorker is an enterprise-level data protection software platform that automates data backups to tape, disk, and flash-based storage media across physical and virtual environments. A number of different operating systems (e.g., Windows, MacOS, Linux, etc.) are supported through cross-platform supports. Deduplication of backup data is provided by integration with systems such as DellEMC Data Domain and other similar storage solutions.

Figure 2:
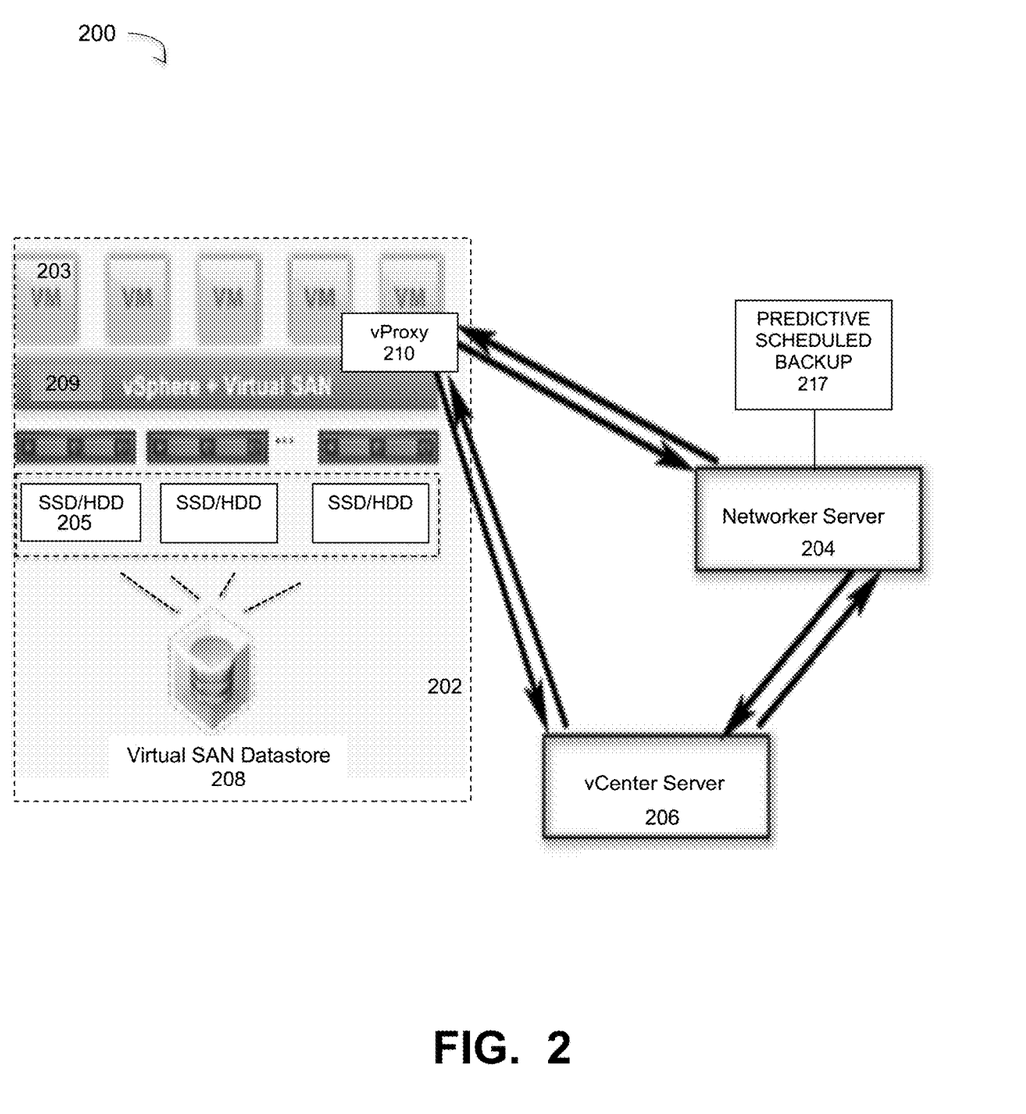
FIG. 2 is a system diagram of an example NetWorker-based data protection system that implements a predictive scheduled backup process, under some embodiments.

FIG. 2 is a system diagram of an example NetWorker-based data protection system that implements a predictive scheduled backup process, under some embodiments. In system 200 of FIG. 2, a central NetWorker server 204 manages a data zone 202 that contains backup clients and NetWorker storage nodes that access the backup media. A management console provides a user interface for functions such as client configuration, policy settings, schedules, monitoring, reports, and daily operations for deduplicated and non-deduplicated backups. For the example embodiment shown, data zone 202 includes a number of VMs 203 that access a number of physical SSD and/or HDD storage devices 205 a virtualization layer 209. The data storage devices 205 comprise a virtual SAN datastore 208. The NetWorker server 204 can also interact with a vCenter server 206 where the data zone 202 represents part of a vCenter 106, such as shown in FIG. 1.

The core NetWorker server 204 software backs up client file systems and operating system environments. Additional processes may include a snapshot management that automates the generation of point-in-time data snapshots and cloning on supported storage arrays, and volume shadow copy services that support backup and recovery of virtual servers to protect parent and child partitions running within virtual machines. The virtual machines 203 can be directly backed up either by installing the NetWorker client on the virtual machines or through the NetWorker VMware Protection solution that leverages vProxies 210 to perform application consistent image and filesystem backups. Server 204 thus supports vSAN datastore 208 for its virtual vProxy appliance and supports running image backups and restores virtual machines running on vSAN datastores. In general, a proxy server acts as a gateway between devices in a network as a kind of intermediate server. In an embodiment, the vProxy secures the virtualized infrastructure 202 behind a firewall while still permitting remote access by users to their respective VMs.

In an embodiment, NetWorker server 204 includes, accesses, or otherwise executes a predictive scheduled backup process 217. This process can be implemented as part of or supplemental to the NetWorker software in any appropriate form, such as a part of the NetWorker logic or as broker logic that helps assign jobs within the NetWorker software.

Figure 3:
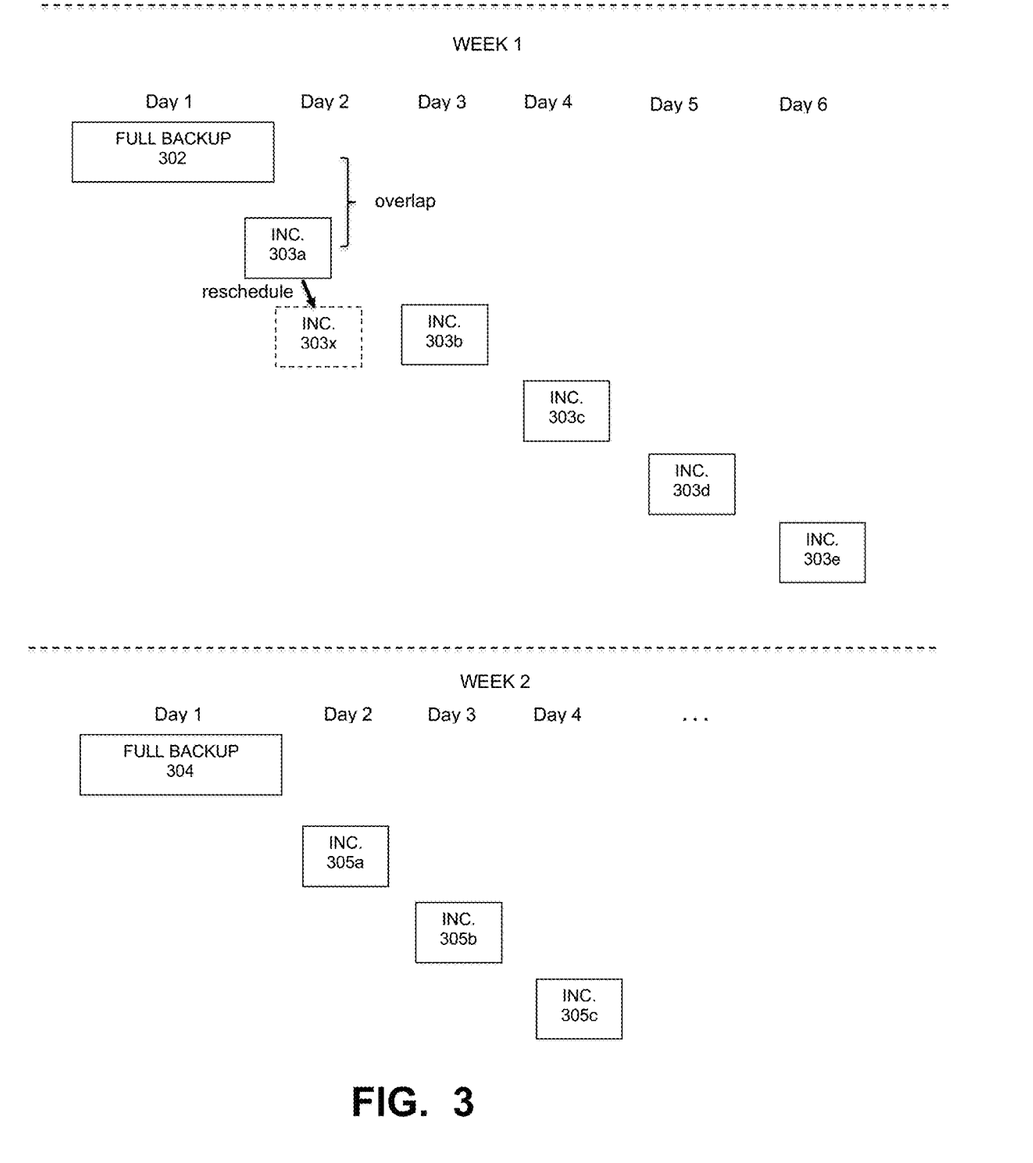
FIG. 3 illustrates an example backup schedule implemented by a backup server, under some embodiments.

The backup server of FIG. 1 or the NetWorker server of FIG. 2 generally implements backup software that regularly backs up each VM in a regular manner according to a defined schedule. FIG. 3 illustrates an example backup schedule implemented by a backup server, under some embodiments. A typical backup routine involves taking periodic full backups on a weekly or monthly basis and taking incremental backups more frequently and in between the full backups to make copies of all changed on a more granular basis, without involving the time and processing overhead required for full backups.

In general, a full backup backs up all the files in a partition or disk by copying all disk sectors with data to a backup image file. It is a relatively simple process but can take a significant amount to time and disk space. A differential backup backs up only the data that is changed from the last full backup. Since not all the data is usually changed immediately after a full backup, a differential backup is usually much quicker than a full backup. This type of backup is also called a cumulative incremental backup. An incremental backup backs up only the data that is changed from a last full or incremental backup, and is also called a differential incremental backup. For purposes of description, any less than full backup which may be either a differential or incremental backup is referred to herein as an incremental backup.

The backup example of FIG. 3 shows full backups 302 and 304 being performed on a weekly basis, with each followed by daily incremental backups, 303a-e, and 305a-c, etc. In most cases, the incremental backups, if performed daily for a typical size VM or disk space can easily complete the backup process within their allotted time period (e.g., one day). A full backup, however, may take much longer to complete, and in fact may exceed 24 hours. This situation is illustrated in FIG. 3 as the overlap between full backup 302 and the next scheduled incremental backup 303a. As stated earlier, in present systems, the unfinished status of full backup 302 on day 2 would cause incremental backup 303a to be blocked and not performed at all, leading to only the next scheduled backup 303b to be performed on day 3 and a potential gap in backed up data on day 2. In an embodiment, the predictive scheduled backup process 117 predicts the overall backup time needed by full backup 302 and dynamically reschedules incremental backup 303a to start after this backup is completed, rather than canceling it altogether. Thus, as shown in FIG. 3, the incremental backup 303a is rescheduled to start some time after completion of full backup 302, but still within day 2 as incremental backup 303x.

The backup schedule of FIG. 3 is provided as an example only, and any other backup schedule may be utilized, such as daily full backups followed by hourly incremental backups, monthly full backups followed by weekly incremental backups, consecutive hourly or daily full backups, and so on.

As stated above, the predictive scheduled backup process 117 estimates a completion time of an active backup job and reschedules the next overlapping scheduled job after the completion of the active job, rather than skipping the overlapping job. This process dynamically predicting the ongoing active backup job completion time, to overcome the above-mentioned and other problems associated with overlapping backup jobs.

Figure 4:
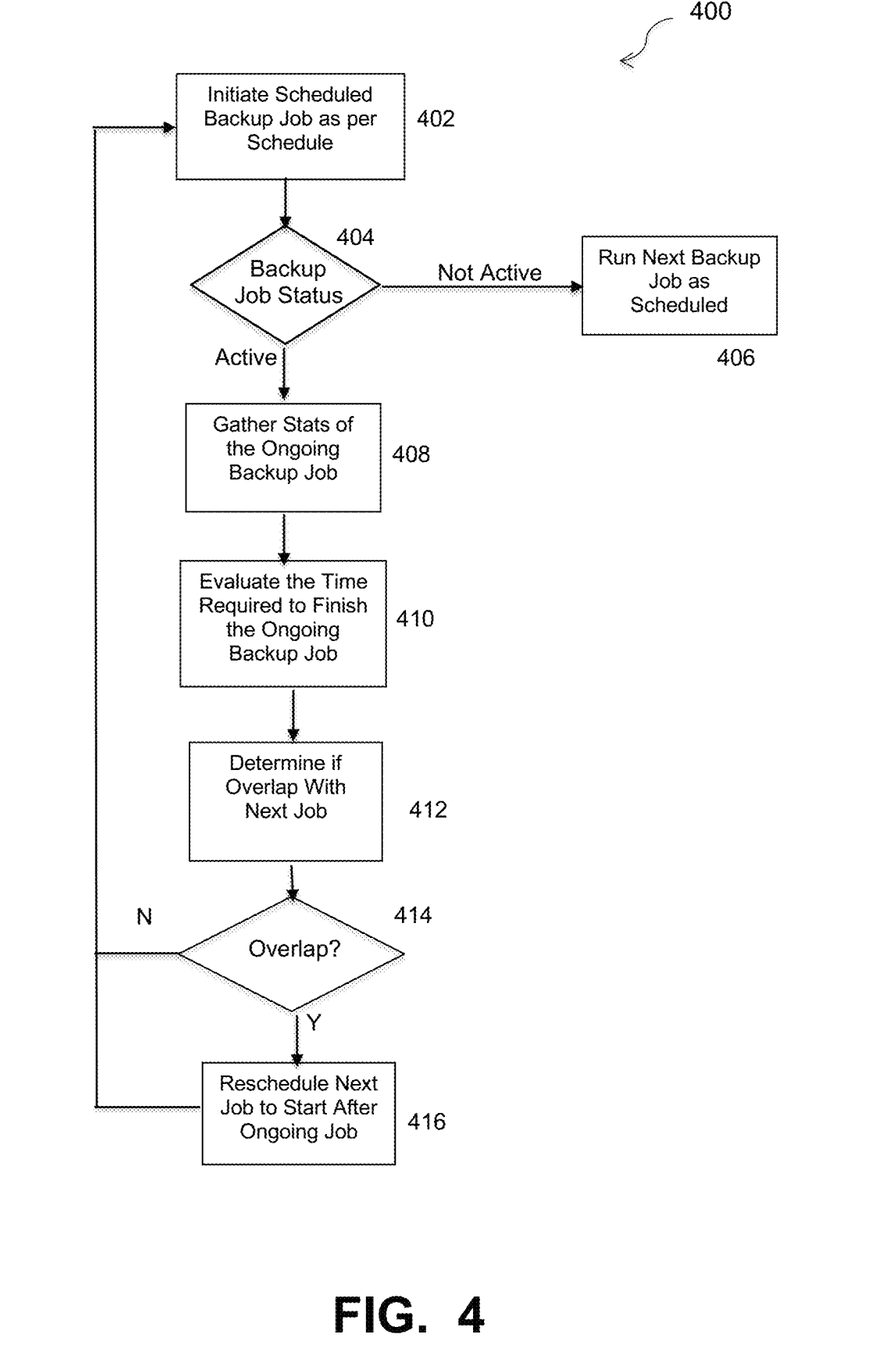
FIG. 4 is a flowchart that illustrates a method of performing predictive scheduled backups, under some embodiments.

FIG. 4 is a flow diagram illustrating an overall process of providing a predictive scheduled backup process, under some embodiments. As shown in FIG. 4, process 400 begins by initiating a scheduled backup job as per a defined backup schedule, 402, such as that shown in FIG. 3 with a full backup on day 1 followed by subsequent incremental backups. The status of the backup job is determined in step 404, and if the status is "not active," the backup scheduled job is run as scheduled, 406. An active job is a backup job that is still running, and box 406 signifies that if a backup is complete for a policy, the next scheduled backup job is run.

For an active backup job, the process gathers certain statistics of the ongoing (current) backup job, 408. It then evaluates the time required to finish the ongoing backup job, 410. In determination step 414, the process determines whether or not there is an overlap between the current backup job and the next scheduled backup job. It does this by comparing the scheduled start time of the next scheduled backup job and the estimated end time of the next scheduled backup job. If there is no overlap, the next scheduled backup job is initiated as scheduled, 402. If, however, there is an overlap, the process reschedules the next job to start after the estimated completion time of the current job, 416, and the job is then initiated at this rescheduled time, 402.

As shown in FIG. 4, the estimated time of completion of the current backup job is determined through certain statistics gathered for the current backup job. These statistics can be gathered for certain defined operating parameters of the system in relation to the specific processes of the backup job. In an embodiment, the statistics are gathered from a media database of the backup server, or some other equivalent data structure that stores statistics for the backup server and the backup media. The media database is a database maintained by NetWorker server on a backup media to keep the detailed information such as which backup resides on which media and detailed statistics of the backup.

In an embodiment, this estimate is primarily made on the basis of the throughput to the target device parameter, which is a most useful parameter to help determine the completion time of the current ongoing job. Throughput to the target device is the measurement of the amount of data written in a specific period of time to a target device. This information is gathered from Data Domain and provides a derived value based on amount of data and time taken to write that data.

Other parameters can also be considered, such as type of the target device (e.g., Flash, HDD, SSD, etc.), NIC (network interface controller) transfer rate, CPU usage during backup, amount of data to be written for finer prediction of the completion time, and so on. In addition, other factors like server parallelism, Data Domain backup streams, client parallelism and the number of vProxies could also be used for predicting the backup time. In general, however, at least some of these are factors may be factored before the sessions are assigned to the vProxy and do not directly impact the ongoing active job, while other parameters play their part before the job is assigned to the vProxy.

In an embodiment, the throughput to target device (TTD) parameter is a single value derived by the system and stored in the media database. Alternatively, it may be a value calculated based on an amalgamation or combination of several other parameters. Once the appropriate TTD parameter is determined, the system calculates the closest approximation for prediction can be achieved by using various methods, such as through median calculation, high and low latency transfer rate, time-based estimation, and so on. For example, if the data remaining to be transferred is 10 Gb at the time of the next scheduled backup and the rate at which the data is written is 1 MB/sec, the appropriate estimate for the ongoing backup operation to end is 2 hours 51 minutes. Hence, the schedule of the next incremental backup should be automatically updated to initiate an incremental backup at 2:52 PM based on this calculation.

In an embodiment, a rescheduled backup job is rescheduled such that it begins shortly after the estimated completion time of the current overlapping job. A buffer time, such as on the order of one to two minutes may be provided to allow the system to perform any required clean up tasks. For example, a vProxy may require some time to let go of an old session, and so on.

Figure 5:
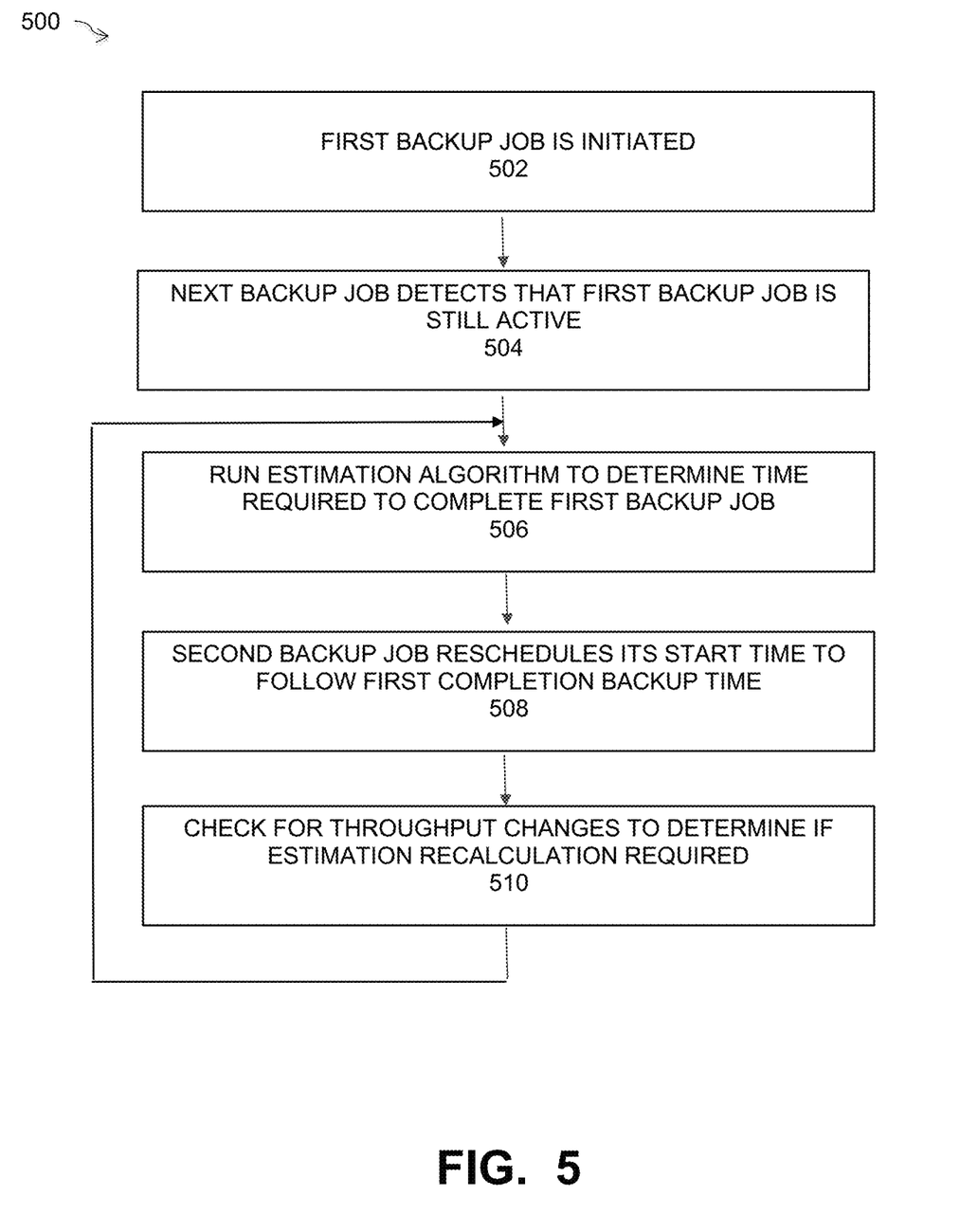
FIG. 5 is a flowchart that illustrates a method of backup job time estimation, under some embodiments.

In an embodiment, a time estimation algorithm is run by each scheduled backup job to determine whether the previous backup job has completed, or is still running as a current backup job. FIG. 5 is a flowchart that illustrates a method of backup job time estimation, under some embodiments. As shown in FIG. 5, process 500 begins with initiating a first (e.g., Day 1, full) backup job, 502. The next backup job (e.g., Day 2, incremental) is then duly initiated as scheduled. This backup job runs a detection process that whether or not the first backup is still active, 504. As soon as the scheduled backup detects an active backup job, it runs the estimation algorithm to find out how much more time it would need to complete the ongoing backup, backup 506.

Based on the estimation algorithm's calculation, the scheduled job is automatically updated for initiation as soon as the current first job is completed (e.g., in the above example the schedule backup is updated to run at 2:52 PM), 508. In an embodiment, the scheduled backup is triggered as per the estimation when the previous backup operation is completed.

For the process 500 of FIG. 5, it should be noted that the estimation algorithm is run whenever there is an overlap in consecutively scheduled (sequential) backup operations. The overlap backup cases may be on-demand backup cases which are non-scheduled backups. If a user chooses to run an on-demand backup and another backup job is running for the same policy, it would fail because no estimation is done during the on-demand backup.

Depending on system specifics, every estimation provided by the estimation algorithm may be different as system and backup process data keeps changing dynamically in normal operating conditions. In most cases, the amount of change or variability is usually small so that initial estimates of completion time are sufficiently accurate to schedule the next job. However, in certain cases or in particularly volatile networks (e.g., variable speed target storage devices, weak network links, variable backup job sizes, and so on) the amount of possible variation in the estimated completion time may be significant. Thus, the estimation is not strictly independent of any network speed or any underlying system and backup job configurations.

In an embodiment, the process 500 includes a dynamic recalculation process that can modify an estimated completion time through a re-calculation step, 510. For this process, when the calculation is made to reschedule the next job using the throughput (TDD) parameter, the process periodically checks for the throughput changes. If it is determined that this parameter changes sufficiently with respect to a defined threshold (watermark) increase/decrease change in the parameter, the estimation step 506 is run again to re-estimate the completion time of the current job based on the changed throughput parameter value, as shown by the processing loop of steps 506 to 510 in FIG. 5.

For an embodiment in which there is only one parameter in the time estimation calculation, only one metric is considered to be that which could dynamically change over the network. In this case, the process monitors the throughput parameter for significant changes, and any rescheduling calculations 510, start only when the throughput exceeds the threshold limits. If more than one parameter is used, any or all of these parameters can be monitored and compared to respective thresholds. In certain cases, such as if several parameters are involved, only high priority parameters can be considered, or the parameters can be combined or weighted for threshold comparison purposes. This should address any drastic variations in the parameters and recalculate the schedules as per new changed parameters accordingly.

In an embodiment, a change in the throughput parameter may be used to adjust the start time of the next scheduled backup job either later or earlier than a first estimate. For example, if a change in the TDD parameter indicates that the first job will be completed earlier than indicated by a first estimate, the start time of the second job may be moved forward accordingly.

Following is an example software code segment illustrating an implementation of the estimation algorithm, under some embodiments.

```
Active backup job    initiate scheduled job as per
<active, reschedule algorithm>  new calculations
Reschedule backup job
initiate Scheduled job
Start ( )
If backup(state) == "Active"
Then,
    * Collect the required stats from the media DB regarding the
    ongoing active job.
    * Derive meaningful parameters from the collected stats.
    * With the help of the above stats, evaluate the time required
    for the present active job to complete.
    * Reschedule the scheduled backup based on the calculations in
    step 3.
    If backup(state)!= "Active"
Then,
    Run scheduled backup job as expected as per scheduled policy
    + a nominal snapshot deletion time post the backup is complete.
End( )
```

Note: The whole calculation of the estimation should not take more than couple of seconds as all the parameters used in the calculation are available readily in the media database, however rescheduling the scheduled job should take few seconds to reflect on the schedule.

Although embodiments have been described with respect to network backup comprising certain specific technologies, Data Domain backup servers, and certain backup agents or processes, such as vProxy, it should be noted that embodiments are not so limited, and that other backup systems and methods may also utilize the methods described herein.

As described above, in an embodiment, system 100 processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 6:
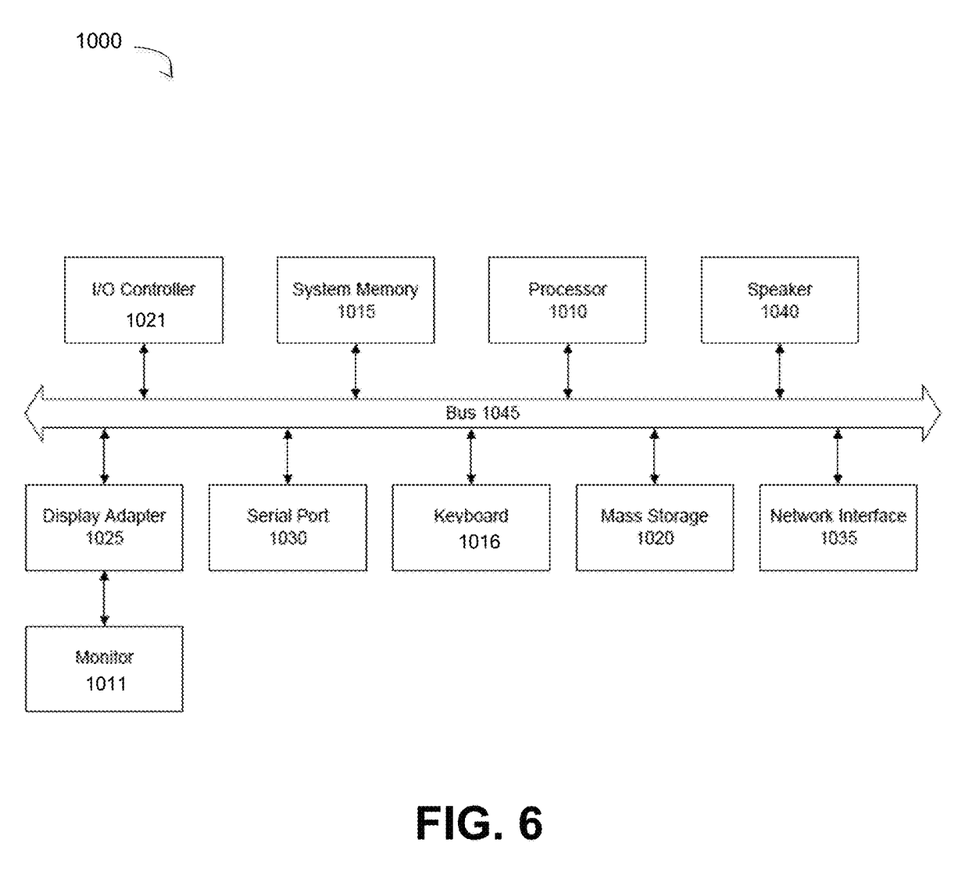
FIG. 6 is a block diagram of a computer system used to execute one or more software components of a system for executing predictive scheduled backups, under some embodiments.

FIG. 6 is a block diagram of a computer system used to execute one or more software components of a system for a predictive scheduled backup process, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 6 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®, family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of predictive scheduled backups of data in a data protection system using virtual machine (VM) based storage, comprising:
    initiating a first backup job in a series of scheduled consecutive backup jobs, wherein a next backup job is allowed to begin only after the first backup job is finished and not active;
    detecting, by the next backup job, if the first backup job is still active;
    gathering, if the first backup job is still active, statistics of the first backup job to evaluate a time required to finish the first backup job including an amount of additional time to finish the first backup job; and
    rescheduling the next backup job to start at least at the end of the additional time.

2. The method of claim 1 wherein the one or more statistics are gathered from a media database of a backup server functionally coupled to the virtual machines.

3. The method of claim 1 wherein the estimated amount of additional time is determined using a throughput to storage device parameter.

4. The method of claim 3 wherein the estimated amount of additional time is further determined through additional parameters including: type of the target device, network transfer rate, processor usage during the first backup, and an amount of data to be written for the first backup.

5. The method of claim 3 further comprising:
    periodically checking the throughput to target device parameter for change from a defined threshold in excess of a defined threshold value; and
    re-executing the estimating step to recalculate the estimated completion time if the change exceeds the defined threshold value.

6. The method of claim 3 wherein the data protection system comprises a data backup system implemented by a Networker backup server and the VM-based storage is implemented using a VMware-based hypervisor.

7. The method of claim 6 wherein the media database is a database maintained by NetWorker server to keep the detailed information such as which backup resides on which media and detailed statistics of the first and next backup jobs.

8. The method of claim 1 wherein the first backup is a full backup and the next backup is one of a differential or incremental backup.

9. The method of claim 8 wherein the full backup is followed by a plurality of incremental backups including the next backup according to a defined periodic schedule.

10. A computer-implemented method of predictive scheduled backups of data in a data protection system using virtual machine (VM) based storage, comprising:

initiating a backup job comprising a first backup followed by a plurality of subsequent backups according to a defined schedule in which a subsequent backup job does not start until an immediately preceding backup job is completed;
gathering statistics of the first backup job when the first backup job is active;
estimating a completion time of the first backup job based on the statistics;
determining if there is an overlap of the estimated completion time of the first backup job and a start time of a second backup job subsequent to the first backup job; and
if so, rescheduling the second backup job to start after the estimated completion time of the first backup job.

11. The method of claim 10 further comprising:
periodically checking for throughput changes;
performing a dynamic recalculation to modify the estimated completion time using a throughput parameter; and
re-estimating the completion time based on any change to the throughput parameter.

12. The method of claim 11 wherein the change to the throughput parameter comprises a deviation in excess of a defined threshold value.

13. The method of claim 12 the throughput parameter comprises a throughput to target device parameter.

14. The method of claim 13 wherein the statistics further comprise at least one of: type of the target device, network transfer rate, processor usage during the first backup, and an amount of data to be written for the first backup.

15. The method of claim 10 wherein the first backup is a full backup and the second backup is one of a differential or incremental backup.

16. A system for predictively scheduling backups of data in a data protection system using virtual machine (VM) based storage, comprising:
a backup server initiating a backup job comprising a first backup followed by a plurality of subsequent backups according to a defined schedule in which a subsequent backup job does not start until an immediately preceding backup job is completed;
a media database storing gathered statistics of the first backup job when the first backup job is active; and
a predictive scheduled backup component estimating a completion time of the first backup job based on the statistics, determining if there is an overlap of the estimated completion time of the first backup job and a start time of a second backup job subsequent to the first backup job, and if so, rescheduling the second backup job to start after the estimated completion time of the first backup job.

17. The system of claim 16 further comprising a dynamic recalculation process periodically checking for throughput changes, performing a dynamic recalculation to modify the estimated completion time using a throughput parameter, and re-estimating the completion time based on any change to the throughput parameter.

18. The system of claim 17 the throughput parameter comprises a throughput to target device parameter.

19. The system of claim 18 wherein the statistics further comprise at least one of: type of the target device, network transfer rate, processor usage during the first backup, and an amount of data to be written for the first backup.

* * * * *